(12) United States Patent
Tanaka et al.

(10) Patent No.: US 12,106,871 B2
(45) Date of Patent: Oct. 1, 2024

(54) WIRE HARNESS

(71) Applicant: SUMITOMO WIRING SYSTEMS, LTD., Yokkaichi (JP)

(72) Inventors: Yuji Tanaka, Yokkaichi (JP); Naoki Seto, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 121 days.

(21) Appl. No.: 17/797,552

(22) PCT Filed: Jan. 19, 2021

(86) PCT No.: PCT/JP2021/001697
§ 371 (c)(1),
(2) Date: Aug. 4, 2022

(87) PCT Pub. No.: WO2021/157340
PCT Pub. Date: Aug. 12, 2021

(65) Prior Publication Data
US 2023/0084894 A1    Mar. 16, 2023

(30) Foreign Application Priority Data

Feb. 4, 2020    (JP) ................. 2020-017006

(51) Int. Cl.
*B60R 16/02*    (2006.01)
*H01B 7/00*    (2006.01)
(Continued)

(52) U.S. Cl.
CPC ....... *H01B 7/0045* (2013.01); *B60R 16/0215* (2013.01); *B60R 16/0222* (2013.01);
(Continued)

(58) Field of Classification Search
CPC ............ B60R 16/0207; B60R 16/0215; B60R 16/027; B60R 16/03; H01B 7/0045;
(Continued)

(56) References Cited

U.S. PATENT DOCUMENTS

| 6,269,813 B1 * | 8/2001 | Fitzgerald ........... A61M 16/024 128/207.29 |
| 2004/0200647 A1 * | 10/2004 | Shingo ..................... B60K 6/40 180/65.285 |

(Continued)

FOREIGN PATENT DOCUMENTS

| JP | H07-038860 U | 7/1995 |
| JP | H09-133260 A | 5/1997 |

(Continued)

OTHER PUBLICATIONS

Mar. 23, 2021 International Search Report issued in International Patent Application No. PCT/JP2021/001697.

*Primary Examiner* — Paresh Paghadal
(74) *Attorney, Agent, or Firm* — Oliff PLC

(57) ABSTRACT

A wire harness for routing in a vehicle in which a pipe through which a liquid flows is attached under a floor, the wire harness including: a first wire to be routed alongside the pipe; and a second wire to be routed in between the first wire and the pipe, and fixed to both the first wire and the pipe, wherein the second wire has: a first section extending along the first wire; and a second section extending along the pipe at a position spaced further from the first wire than is the first section in a direction in which the pipe and the first wire are arranged alongside each other.

9 Claims, 5 Drawing Sheets

(51) Int. Cl.
*H01B 7/40* (2006.01)
*H02G 3/04* (2006.01)
*H02G 3/32* (2006.01)
*H01B 7/20* (2006.01)

(52) U.S. Cl.
CPC .............. *H01B 7/40* (2013.01); *H02G 3/32* (2013.01); *H01B 7/20* (2013.01); *H02G 3/0468* (2013.01)

(58) Field of Classification Search
CPC ... H01B 7/20; H01B 7/40; H02G 3/04; H02G 3/0468; H02G 3/32; H02G 3/36; F16L 3/08; B60K 6/40; B60K 6/48
See application file for complete search history.

(56) References Cited

U.S. PATENT DOCUMENTS

| | | | |
|---|---|---|---|
| 2006/0048993 A1* | 3/2006 | Karube | B62K 5/01 180/296 |
| 2007/0215757 A1* | 9/2007 | Yuta | F16L 55/035 248/68.1 |
| 2018/0175596 A1* | 6/2018 | Sugino | H02G 3/0481 |
| 2018/0233893 A1* | 8/2018 | Adachi | H01B 7/18 |

FOREIGN PATENT DOCUMENTS

| | | |
|---|---|---|
| JP | 2004-340309 A | 12/2004 |
| JP | 2008-232277 A | 10/2008 |
| JP | 2009-029283 A | 2/2009 |

\* cited by examiner

WIRE HARNESS

BACKGROUND

The present disclosure relates to a wire harness.

JP 2018-101462A discloses a wire harness in which a high voltage electrical wire and a low voltage electrical wire are routed alongside each other under the floor of a vehicle. These wires are collectively held by a plurality of clamps. The wire harness is routed under the floor by the clamps being fixed to the vehicle.

SUMMARY

Incidentally, the plurality of electrical wires that are routed alongside each other under the floor may branch out partway along in the longitudinal direction. In this case, the portion of each wire that branches out needs to be fixed to the vehicle, possibly resulting in an increase in the number of points where the wires are fixed to the vehicle. Thus, there is room for improvement in workability during routing of a wire harness.

An exemplary aspect of the disclosure improves workability during routing of a wire harness.

A wire harness of the present disclosure is a wire harness for routing in a vehicle in which a pipe through which a liquid flows is attached under a floor, the wire harness including a first wire to be routed alongside the pipe, and a second wire to be routed in between the first wire and the pipe and fixed to both the first wire and the pipe, the second wire having a first section extending along the first wire, and a second section extending along the pipe at a position spaced further from the first wire than is the first section in a direction in which the pipe and the first wire are arranged alongside each other.

According to the present disclosure, workability during routing of a wire harness can be improved.

DETAILED DESCRIPTION OF EMBODIMENTS

Figure 1:
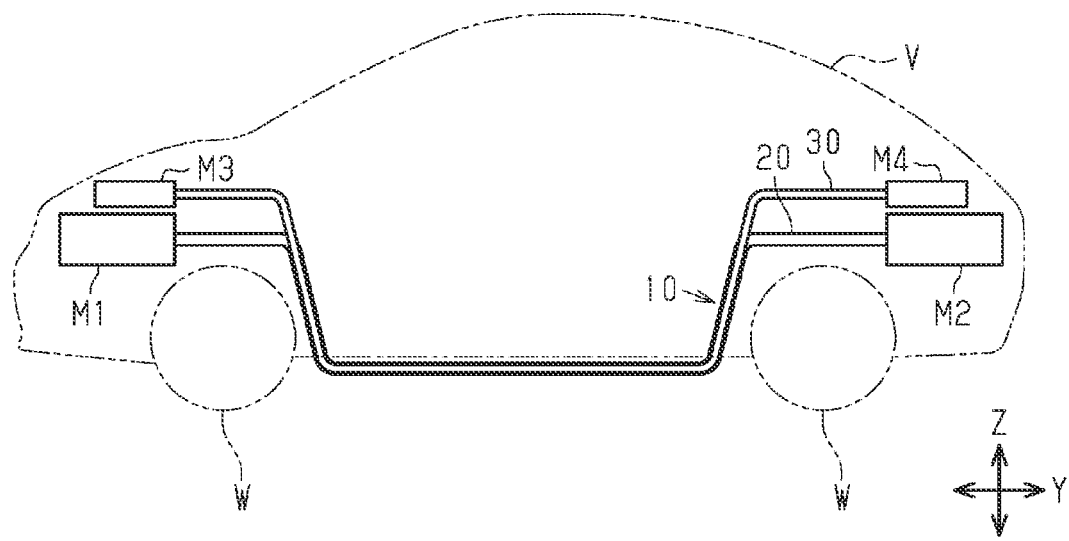
FIG. 1 is a configuration diagram showing a wire harness in one embodiment.

Description of Embodiments of Disclosure initially, modes of the present disclosure will lie enumerated and described.

A wire harness of the present disclosure is:

1. A wire harness for routing in a vehicle in which a pipe through which a liquid flows is attached under a floor, including a first wire member to be routed alongside the pipe, and a second wire member to be routed in between the first wire member and the pipe and fixed to both the first wire member and the pipe, the second wire member having a first section extending along the first wire member, and a second section extending along the pipe at a position spaced further from the first wire member than is the first section in a direction in which the pipe and the first wire member are arranged alongside each other.

According to this configuration, the second wire member is fixed to both the first wire member and the pipe. Thus, when fixing the wire harness to the vehicle, the number of fixing members and fixing points for fixing the wire harness to the vehicle can be reduced, compared with the case where the first wire member, the second wire member and the pipe are individually fixed to the vehicle. Accordingly, workability during routing of the wire harness can be improved.

Also, the second wire member has a first section extending along the first wire member and a second section extending along the pipe at a position spaced from the first wire member. Thus, the degree of freedom of the routing path of the second wire member can be increased, compared with the case where the second wire member extends along only the first wire member or only the pipe.

2. Preferably, the second wire member is fixed to the first wire member in the first section.

According to this configuration, the second wire member is fixed to the first wire member in the first section extending along the first wire member. Thus, the task of fixing the second wire member and the first wire member is facilitated. Accordingly, workability during routing of the wire harness can be improved.

3. Preferably, the second wire member is fixed to the pipe in the second section.

According to this configuration, the second wire member is fixed to the pipe in the second section extending along the pipe. Thus, the task of fixing the second wire member and the pipe is facilitated. Accordingly, workability during routing of the wire harness can be improved.

4. Preferably, the wire harness includes a wire-side fixing member configured to collectively fix the first wire member and the second wire member to a fixing target of the vehicle, and the wire-side fixing member is provided in the first section.

According to this configuration, a wire-side fixing member is provided in the first section, and thus the first wire member and the second wire member are collectively fixed to the fixing target in the first section. Thus, the number of fixing members and fixing points for fixing the wire harness to the vehicle can be reduced, compared with the case where the first wire member and the second wire member are individually fixed to the fixing target in the first section. Accordingly, workability during routing of the wire harness can be improved.

5. Preferably, the wire-side fixing member has a main holding part configured to hold the first wire member and an auxiliary holding part configured to hold the second wire member, the main holding part has a main insertion opening open in a direction orthogonal to a longitudinal direction of the first wire member and through which the first wire member is insertable, the auxiliary holding part has an auxiliary insertion opening open in a direction orthogonal to a longitudinal direction of the second wire member and through which the second wire member is insertable, and, with the wire-side fixing member fixed to the fixing target, the auxiliary insertion opening is open in a direction not facing the fixing target.

According to this configuration, the second wire member can be post-installed in an auxiliary holding part of the wire-side fixing member fixed to the fixing target in a state of holding the first wire member. Workability during routing of the wire harness can thereby be improved, compared with the case where an integrated component in which the first wire member and the second wire member are assembled to a fixing member is fixed to the fixing target.

6. Preferably, the wire harness includes a pipe-side fixing member configured to collectively fix the pipe and the second wire member to the fixing target of the vehicle, and the pipe-side fixing member is provided in the second section.

According to this configuration, a pipe-side fixing member is provided in the second section, and thus the pipe and the second wire member are collectively fixed to the fixing target in the second section. Thus, the number of fixing members and fixing points for fixing the wire harness to the vehicle can be reduced, compared with the case where the pipe and the second wire member are individually fixed to the fixing target in the second section. Accordingly, workability during routing of the wire harness can be improved.

7. Preferably, the pipe-side fixing member has a main holding part configured to hold the pipe and an auxiliary holding part configured to hold the second wire member, the main holding part of the pipe-side fixing member has a main insertion opening open in a direction orthogonal to a longitudinal direction of the pipe and through which the pipe is insertable, the auxiliary holding part of the pipe-side fixing member has an auxiliary insertion opening open in a direction orthogonal to the longitudinal direction of the second wire member and through which the second wire member is insertable, and, with the pipe-side fixing member fixed to the fixing target, the auxiliary insertion opening thereof is open in a direction not facing the fixing target.

According to this configuration, the second wire member can be post-installed in an auxiliary holding part of the pipe-side fixing member fixed to the fixing target in a state of holding the pipe. Workability during routing of the wire harness can thereby be improved, compared with the case where an integrated component in which the pipe and the second wire member are assembled to a fixing member is fixed to the fixing target.

8. Preferably, with the wire harness routed in the vehicle that is in a horizontal state, a lowest part of the second wire member is located higher than a lowest part of the first wire member.

According to this configuration, in the wire harness routed in the vehicle that is in a horizontal state, the first wire member is located lower than the second wire member. It is thereby possible to suppress a reduction in the distance from the ground to the lowest part of the vehicle in which the wire harness is routed, that is, the so-called minimum ground clearance, due to providing the second wire member.

9. Preferably, with the wire harness routed in the vehicle that is in a horizontal state, the lowest part of the second wire member is located higher than a lowest part of the pipe.

According to this configuration, in the wire harness routed in the vehicle that is in a horizontal state, the pipe is located lower than the second wire member. It is thereby possible to suppress a reduction in the distance from the ground to the lowest part of the vehicle in which the wire harness is routed, that is, the so-called minimum ground clearance, due to providing the second wire member.

10. Preferably, the first wire member has an electrical wire, and a metal tube housing the electrical wire.

According to this configuration, the metal tube readily holds its shape, and thus the shape of the first wire member is readily held along the routing path thereof. The shape of the second wire member is readily held, due to the second wire member being fixed to such a first wire member, and thus the shape of the second wire member is readily held without increasing the number of fixing points to the vehicle. Accordingly, workability during routing of the wire harness can be improved.

11. Preferably, the second wire member has a single core wire, and an insulation coating covering an outer periphery of the single core wire.

According to this configuration, the single core wire readily holds its shape, and thus the shape of the second wire member is readily held along the routing path thereof. The shape of the second wire member is thereby readily held without increasing the number of fixing points to the vehicle. Accordingly, workability during routing of the wire harness can be improved.

Detailed Description of Embodiments of Disclosure

A specific example of a wire harness of the present disclosure will be described below with reference to the drawings. In the drawings, parts of the configuration may be exaggerated or simplified for convenience of description. Also, the dimensional ratios of the various portions may differ between the drawings. Note that the present disclosure is not limited to these illustrative examples and is defined by the claims, and all changes that come within the meaning and range of equivalency of the claims are intended to be embraced therein. Herein, "orthogonal" is not only strictly orthogonal but also includes roughly orthogonal within a range that achieves the operation and effect of the present embodiment.

Configuration of Vehicle V

First, a vehicle V in which a wire harness 10 of the present embodiment is routed will be described, with reference to FIGS. 1 and 2. The vehicle V is a hybrid vehicle or an electric car, for example.

A cylindrical pipe 90 through which a liquid flows is attached under the floor of the vehicle V. The pipe 90 of the present embodiment is, for example, a brake pipe for applying hydraulic pressure to calipers (not shown) of wheels W to brake the wheels W, due to brake fluid flowing therethrough. The pipe 90 is formed of a metal material such as an aluminum-based material, for example.

Figure 2:
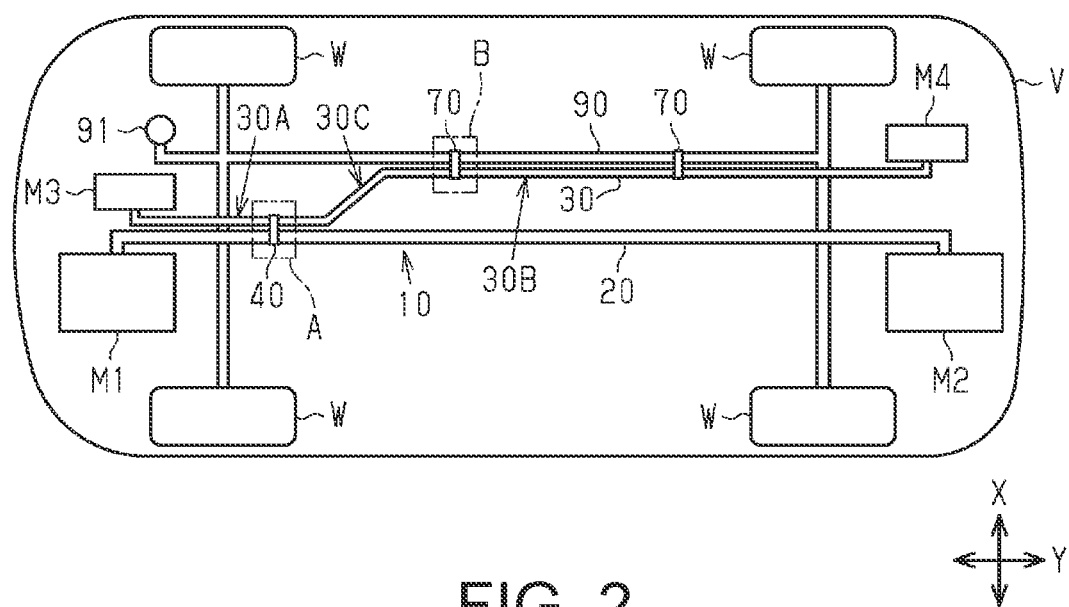
FIG. 2 is a plan view of the wire harness viewed from the underfloor side of the vehicle.

Here, the left-right direction in FIG. 1 is the vehicle front-rear direction, the up-down direction in FIG. 2 is the vehicle width direction, and the up-down direction in FIG. 1 is the vehicle up-down direction. In the following description, for convenience, the direction extending in the vehicle width direction will be referred to as the X-axis direction, the direction extending in the vehicle front-rear direction will be referred to as the Y-axis direction, and the direction extending in the vehicle up-down direction will be referred to as the Z-axis direction. Also, the right side in the X-axis direction will be simply referred to as the right side, and the left side in the X-axis direction will be simply referred to as the left side. Note that the lower side in FIG. 2 is the right side, and the upper side in FIG. 2 is the left side.

The pipe 90 is routed from a master cylinder 91 to the caliper of each wheel W with part thereof in the length direction passing under the floor of the vehicle V.

The pipe 90 extends in the Y-axis direction at a position displaced to the left side from a central portion of the vehicle V in the X-axis direction, and branches at positions corresponding to the respective wheels W in the Y-axis direction and extends toward the respective calipers.

Overall Configuration of Wire Harness 10

As shown in FIGS. 1 and 2, the wire harness 10 includes a first wire member 20 (first wire) that electrically connects a first device M1 and a second device M2 installed in the vehicle V, and a second wire member 30 (second wire) that electrically connects a third device M3 and a fourth device M4 installed in the vehicle V. Also, the wire harness 10 includes a wire-side fixing member 40 for fixing the first wire member 20 and the second wire member 30 to the vehicle V, and a plurality of pipe-side fixing members 70 for fixing the pipe 90 and the second wire member 30 to the vehicle V.

The first wire member 20 is, for example, routed in the Y-axis direction from the first device M1 to the second device M2 with part thereof in the length direction passing under the floor of the vehicle V. The first wire member 20 is routed alongside the pipe 90.

As examples of the first device M1 and the second device M2, the first device M1 is an inverter disposed in the front part of the vehicle V, and the second device M2 is a high voltage battery disposed in the rear part of the vehicle V. The first device M1 serving as an inverter is, for example, connected to a motor (not shown) for driving wheels that serves as a power source of vehicle travel. The inverter generates AC power from the DC power of the high voltage battery and supplies the AC power to the motor. The second device M2 serving as a high voltage battery is, for example, a battery capable of supplying a voltage of 100 volts or more.

The second wire member 30 is routed from the third device M3 to the fourth device M4 with part thereof in the length direction passing under the floor of the vehicle V. The second wire member 30 is routed in between the first wire member 20 and the pipe 90. As examples of the third device M3 and the fourth device M4, the third device M3 is a relay box disposed in the front part of the vehicle V, and the fourth device M4 is a low voltage battery disposed in the rear part of the vehicle V. The relay box distributes the voltage of the low voltage battery to various devices installed in the vehicle V.

Configuration of First Wire Member 20

Figure 3:
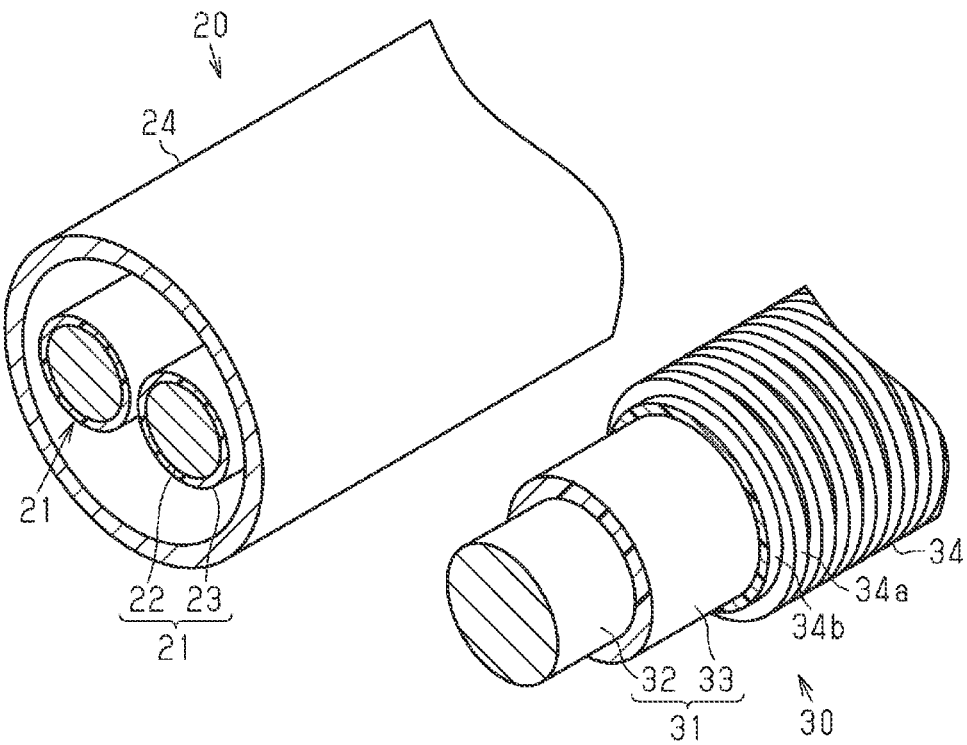
FIG. 3 is a perspective view showing the configuration of a first wire member and a second wire member.

As shown in FIG. 3, the first wire member 20 has two first wires 21 and a metal tube 24 housing the first wires 21. The first wires 21 each have a first conductor 22 and a first insulation coating 23 covering the outer periphery of the first conductor 22. The first wires 21 are an example of an electrical wire.

The first conductor 22 is a single core wire having a columnar shape with a solid structure internally. A metal material such as a copper or aluminum-based material can be used for the first conductor 22. The first conductor 22 is formed by extrusion molding, for example.

The cross-sectional shape of the first conductor 22 orthogonal to the length direction, that is, the traverse sectional shape, can be any shape. The traverse sectional shape of the first conductor 22 can be formed to be circular, semicircular, polygonal, square or flat, for example.

The first insulation coating 23 covers the outer peripheral surface of the first conductor 22 over the entire circumference, for example. The first insulation coating 23 is constituted by a resin material such as a crosslinked polyethylene-based resin material, for example. The first insulation coating 23 can be formed by extrusion molding on the first conductor 22, for example.

The tube 24 has a long cylindrical shape as a whole. The tube 24 has a larger outer diameter than the pipe 90. The tube 24 protects the first wires 21 from projectiles and water droplets, for example.

A metal material such as a copper or aluminum-based material can be used for the tube 24. The tube 24 of the present embodiment has a rigidity capable of holding its shape.

Herein, "rigidity" is the degree to which an object is not susceptible to a bending force or the like. Also, "a rigidity capable of holding its shape" indicates that the object does not readily bend under its own weight.

Note that the first wires 21 are not housed in the tube 24 over their entirety in the longitudinal direction, and, in a vicinity of respective ends of the first wires 21 that are connected to the first device M1 and the second device M2, are covered with an exterior member that is more flexible than the tube 24. Also, at both ends, a conductor such as a stranded wire that is more flexible than the first conductor 22 is connected to the first conductor 22. Note that a grommet or a corrugated tube is given as an example of the exterior member.

Configuration of Second Wire Member 30

As shown in FIG. 3, the second wire member 30 includes a second wire 31 and a corrugated tube 34 housing the second wire 31. The second wire 31 has a second conductor 32 and a second insulation coating 33 covering the outer periphery of the second conductor 32. The second insulation coating 33 is an example of an insulation coating.

The second conductor 32 is a single core wire having a columnar shape with a solid structure internally. A metal material such as a copper or aluminum-based material can be used for the second conductor 32. The second conductor 32 of the present embodiment has a rigidity capable of holding its shape. The second conductor 32 is formed by extrusion molding, for example.

The cross-sectional shape of the second conductor 32 orthogonal to the length direction, that is, the traverse sectional shape, can be any shape. The traverse sectional shape of, the second conductor 32 can be formed to be circular, semicircular, polygonal, square or flat, for example.

The second insulation coating 33 covers the outer peripheral surface of the second conductor 32 over the entire circumference, for example. The second insulation coating 33 is constituted by a resin material such as a crosslinked polyethylene-based resin material, for example. The second insulation coating 33 can be formed by extrusion molding on the second conductor 32, for example.

The corrugated tube 34 has a cylindrical shape that encloses the outer periphery of the second wire 31 as a whole, for example. The corrugated tube 34 has a bellows structure in which an annular raised part 34a and an annular recessed part 34b are alternately linked in the length direction thereof. A non-conductive resin material such as polyolefin, polyamide, polyester or ABS resin is used for the corrugated tube 34 of the present embodiment.

The corrugated tube 34, that is, the annular raised part 34a, has a smaller outer diameter than the tube 24 of the first wire member 20 and the pipe 90. Accordingly, the second wire 31 has a smaller outer diameter than the tube 24 of the first wire member 20 and the pipe 90.

As shown in FIG. 2, the second wire member 30 has a first section 30A extending along the first wire member 20 and a second section 30B extending along the pipe 90 at a position spaced further from the first wire member 20 than is the first section 30A in the direction in which the pipe 90 and the first wire member 20 are arranged alongside each other. Also, the second wire member 30 has a third section 30C extending between the first section 30A and the second section 30B.

In the present embodiment, the first section 30A is provided on the front side of the vehicle V, and the second section 30B is provided on the rear side of the vehicle V. The third section 30C is located between the front and rear wheels W in the Y-axis direction. The third section 30C extends at an angle so as to be positioned further to the left side moving toward the rear side of the vehicle V.

Note that the corrugated tube 34 of the present embodiment extends through at least the first section 30A, the second section 30B and the third section 30C.

In a vicinity of respective ends of the second wire 31 that are connected to the third device M3 and the fourth device M4, a conductor such as a stranded wire that is more flexible than the second conductor 32 is connected to the second conductor 32.

Configuration of Wire-Side Fixing Member 40

Figure 4:
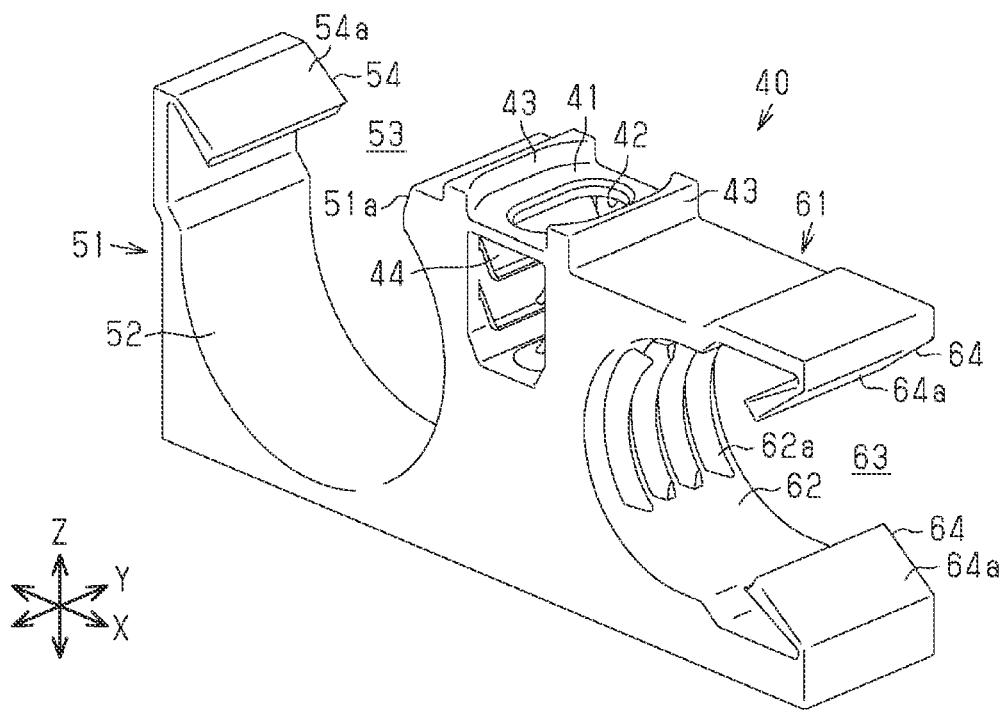
FIG. 4 is a perspective view of a wire-side fixing member.
Figure 5:
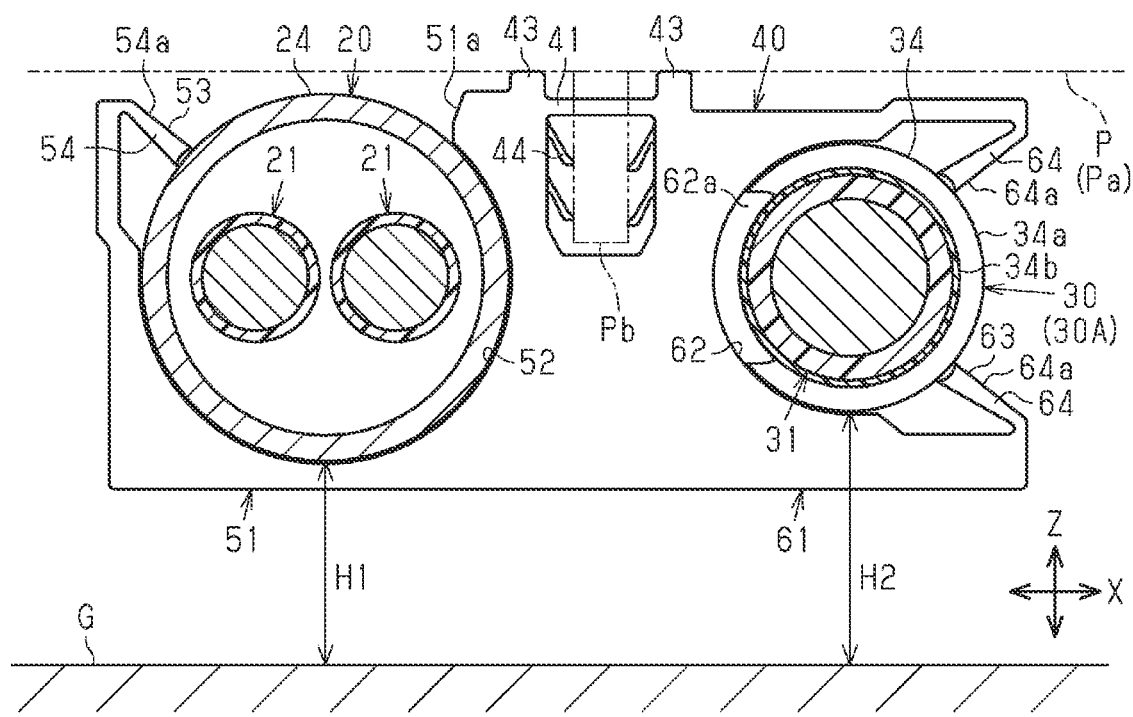
FIG. 5 is a cross-sectional view of an A portion of the wire harness in FIG. 2.

As shown in FIGS. 4 and 5, the wire-side fixing member 40 has a fixing part 41 that is fixed to an assembly surface Pa of a panel P constituting a floor part of the vehicle V, a main holding part 51 that holds the first wire member 20, and an auxiliary holding part 61 that holds the second wire member 30. The main holding part 51 and the auxiliary holding part 61 are integrally provided either side of the fixing part 41 in the X-axis direction. The wire-side fixing member 40 is a resin molded article formed by injection molding. Note that the panel P is an example of a fixing target.

The wire-side fixing member 40 collectively fixes the first wire member 20 and the second wire member 30 to the panel P in the first section 30A. In the first section 30A, the second wire member 30 is fixed to the first wire member 20 by the wire-side fixing member 40.

As shown in FIG. 5, the assembly surface Pa of the panel P is configured to be substantially horizontal when the vehicle V is in a horizontal state. A column part pb composed of a stud bolt, for example, protrudes vertically from the assembly surface Pa.

As shown in FIGS. 4 and 5, an insertion hole 42 into which the column part pb is inserted is formed in the upper surface of the fixing part 41. Also, around the insertion hole 42 in the upper surface of the fixing part 41, a pair of abutting parts 43 that abut the assembly surface Pa are provided in a protruding manner. The abutting parts 43 face each other across the insertion hole 42.

The fixing part 41 has a plurality of latching pieces 44 that latch, in the protruding direction of the column part Pb, onto the column part Pb inserted into the fixing part 41 through the insertion hole 42. The fixing part 41 is fixed to the assembly surface Pa, due to the latching pieces 44 latching onto the column part Pb.

Configuration of Main Holding Part 51

The main holding part 51 has a holding surface 52 that is arc-shaped along the outer peripheral surface of the first wire member 20. The outer peripheral surface of the first wire member 20 is held by the holding surface 52.

The main holding part 51 has a main insertion opening 53 that is open in a direction orthogonal to the longitudinal direction of the first wire member 20 and through which the first wire member 20 is insertable. With the wire-side fixing member 40 fixed to the panel P, the main insertion opening 53 is open in a direction facing the panel. P. The first wire member 20 is inserted through the main insertion opening 53 from the direction orthogonal to the longitudinal direction thereof.

At the upper end portion of the main holding part 51, a holding piece 54 extending toward the center axis of the first wire member 20 held by the holding surface 52 is formed. The tip end portion of the holding piece 54 has an arc shape in cross section that is depressed in a direction away from the first wire member 20 held by the holding surface 52. The first wire member 20 held by the holding surface 52 is held from above by the tip end portion of the holding piece 54.

The main insertion opening 53 of the present embodiment is constituted by a side surface 54a of the holding piece 54 and a side surface 51a of the main holding part 51 that faces the side surface 54a in the X-axis direction. The side surface 54a of the holding piece 54 and the side surface 51a of the main holding part 51 are inclined to approach each other moving toward the holding surface 52 side.

The opening width of the main insertion opening 53 in the X-axis direction, that is, the interval between the side surface 54a of the holding piece 54 and the side surface 51a of the main holding part 51, is formed smaller than the outer diameter of the tube 24 of the first wire member 20. The first wire member 20 is inserted through the main insertion opening 53, due to the holding piece 54 elastically deforming to increase the opening width, when inserting the first wire member 20 through the main insertion opening 53. At this time, the first wire member 20 is guided toward the holding surface 52 by the side surface 54a of the holding piece 54 and the side surface 51a of the main holding part 51.

Configuration of Auxiliary Holding Part 61

The auxiliary holding part 61 has a holding surface 62 that is arc-shaped along the outer peripheral surface of the second wire member 30. A plurality of fitting raised parts 62a that fit into a plurality of the annular recessed parts 34b of the corrugated tube 34 protrude on a portion of the holding surface 62 on the fixing part 41 side. The plurality of fitting raised parts 62a are provided at intervals from each other in the Y-axis direction. Movement of the corrugated tube 34 in the Y-axis direction is regulated, due to the fitting raised parts 62a fitting into the annular recessed parts 34b.

The auxiliary holding part 61 has an auxiliary insertion opening 63 that is open in a direction orthogonal to the longitudinal direction of the second wire member 30 and through which the second wire member 30 is insertable. With the wire-side fixing member 40 fixed to the panel P, the auxiliary insertion opening 63 is open in a direction not facing the panel P. In the present embodiment, the wire-side fixing member 40 is fixed to the panel. P so that the auxiliary insertion opening 63 is open to the left side. The second wire member 30 is inserted through the auxiliary insertion opening 63 from a direction orthogonal to the longitudinal direction thereof.

At one end portion of the auxiliary holding part 61 in the X-axis direction, a pair of holding pieces 64 extending toward the center axis of the second wire member 30 held by the holding surface 62 are formed. The tip end portion of each holding piece 64 has an arc shape in cross section that is depressed in a direction away from the second wire member 30 held by the holding surface 62. The second wire member 30 held by the holding surface 62 is held from one side in the X-axis direction by the tip end portion of each holding piece 64.

The auxiliary insertion opening 63 of the present embodiment is constituted by side surfaces 64a of the holding pieces 64 that face each other in the Z-axis direction. The side surfaces 64a are inclined to approach each other moving toward the holding surface 62 side.

The opening width of the auxiliary insertion opening 63 in the Z-axis direction, that is, the interval between the side surfaces 64a of the holding pieces 64 is formed smaller than the outer diameter of the corrugated tube 34 of the second wire member 30. The second wire member 30 is inserted through the auxiliary insertion opening 63, due to the holding pieces 64 elastically deforming to increase the opening width, when inserting the second wire member 30 through the auxiliary insertion opening 63. At this time, the second wire member 30 is guided toward the holding surface 62 by the side surfaces 64a of the holding pieces 64.

As shown in FIG. 5, in the wire harness 10 fixed to the panel P of the vehicle V that is in a horizontal state, the lowest part of the second wire member 30 is located higher than the lowest part of the first wire member 20. That is, a height IP of the second wire member 30 from a ground G is higher than a height H1 of the first wire member 20 from the ground G.

Configuration of Pipe-Side Fixing Member 70

The pipe-side fixing member 70 has a similar configuration to the wire-side fixing member 40. Accordingly, in the description of the pipe-side fixing member 70, configuration that is the same as the wire-side fixing member 40 will be given the same reference signs. Also, with regard to configuration corresponding to the wire-side fixing member 40, redundant description may be omitted by giving reference signs "8*" obtained by adding "30" to the reference signs "5*" indicating configuration of the wire-side fixing member 40.

Figure 6:
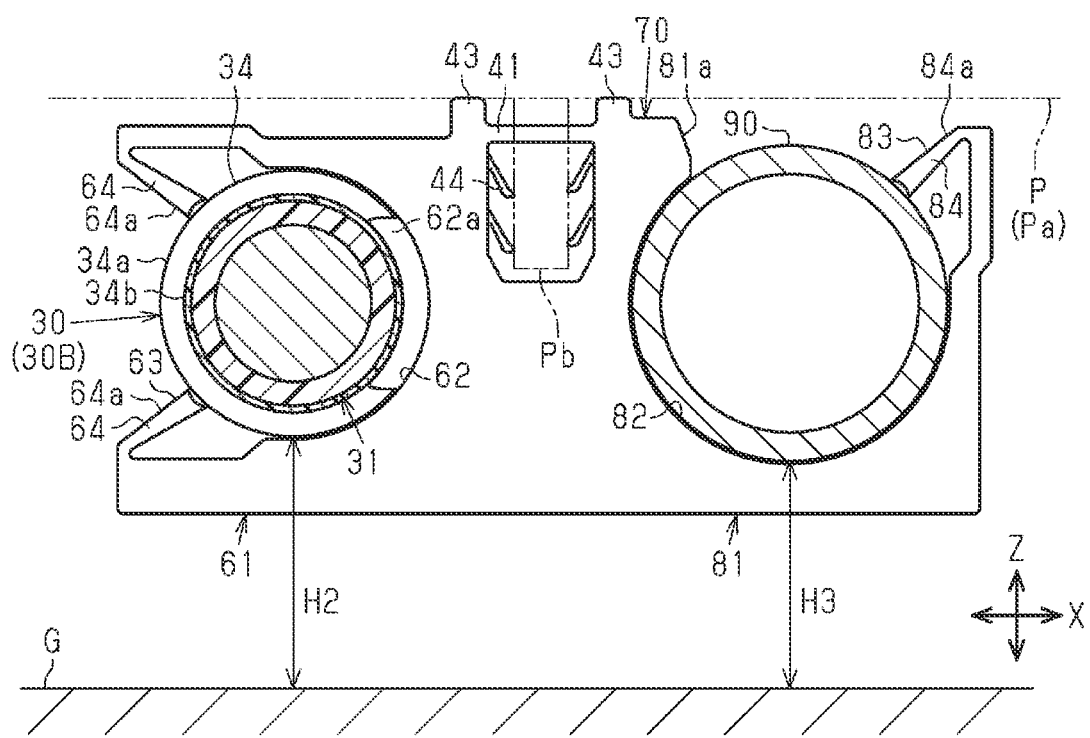
FIG. 6 is a cross-sectional view of a B portion of the wire harness in FIG. 2.

As shown in FIG. 6, the pipe-side fixing member 70 has a fixing part 41 that is fixed to the assembly surface Pa of the panel P of the vehicle V, a main holding part 81 that holds the pipe 90, and an auxiliary holding part 61 that holds the second wire member 30.

The pipe-side fixing member 70 collectively fixes the pipe 90 and the second wire member 30 to the panel P in the second section 30B. In the second section 30B, the second wire member 30 is fixed to the pipe 90 by the pipe-side fixing member 70. As shown in FIG. 2, in the present embodiment, two pipe-side fixing members 70 are provided at an interval from each other in the Y-axis direction.

In the present embodiment, the pipe-side fixing member 70 is fixed to the panel P such that the auxiliary insertion opening 63 is open to the right side.

In the wire harness 10 fixed to the panel. P of the vehicle V that is in a horizontal state, the lowest part of the second wire member 30 is located higher than the lowest part of the pipe 90. That is, the height H2 of the second wire member 30 from the ground. G is higher than a height H3 of the pipe 90 from the ground G.

From the above, in the wire harness 10 fixed to the panel P of the vehicle V that is in a horizontal state, the relationship H1<H3<H2 holds between the heights H1 to H3 of the first wire member 20, the second wire member 30 and the pipe 90 from the ground G.

Fixing Procedure of Wire Harness 10

Next, the procedure for fixing the wire harness 10 of the present embodiment to the panel. P will be described.

First, the fixing procedure of the wire harness 10 in the first section 30A will be described.

First, the first wire member 20 is assembled to the main holding part 51 of the wire-side fixing member 40. At this time, the first wire member 20 is inserted through the main insertion opening 53 of the main holding part 51 from a direction orthogonal to the longitudinal direction thereof. At this time, the first wire member 20 abuts the side surface 54a of the holding piece 54 and the side surface 51a of the main holding part 51 that constitute the main insertion opening 53. The holding piece 54 thereby bends so as to withdraw from the first wire member 20. Then, when the first wire member 20 is inserted to the position where it is held by the holding surface 52, the holding piece 54 elastically returns, resulting in the first wire member 20 being held by the holding surface 52 and the holding piece 54.

After assembling the first wire member 20 to the main holding part 51 of the wire-side fixing member 40, the fixing part 41 of the wire-side fixing member 40 is fixed to the column part Pb. At this time, the abutting parts 43 of the fixing part 41 abut the assembly surface Pa.

Next, the second wire member 30 is assembled to the auxiliary holding part 61 of the wire-side fixing member 40. At this time, the second wire member 30 is inserted through the auxiliary insertion opening 63 of the auxiliary holding part 61 from a direction orthogonal to the longitudinal direction thereof, that is, from the left side, more specifically. At this time, the second wire member 30 abuts the side surfaces 64a of the holding pieces 64 that constitute the auxiliary insertion opening 63. The holding pieces 64 thereby bend so as to withdraw from the second wire member 30. Then, when the second wire member 30 is inserted to the position where it is held by the holding surface 62, the holding pieces 64 elastically return, resulting in the second wire member 30 being held by the holding surface 62 and the holding pieces 64.

In the first section 30A, the first wire member 20 and the second wire member 30 are collectively fixed to the panel. P in this manner.

Next, the fixing procedure of the wire harness 10 in the second section 30B will be described, focusing on differences from the fixing procedure of the wire harness 10 in the first section 30A described above.

First, the pipe 90 is assembled to the main holding part 81 of the pipe-side fixing member 70. At this time, the pipe 90 is inserted through the main insertion opening 83 of the main holding part 81 from a direction orthogonal to the longitudinal direction thereof. At this time, the pipe 90 abuts a side surface 84a of a holding piece 84 and a side surface 81a of the main holding part 81 that constitute the main insertion opening 83. The holding piece 84 thereby bends so as to withdraw from the pipe 90. Then, when the pipe 90 is inserted to the position where it is held by the holding surface 82, the holding piece 84 elastically returns, resulting in the pipe 90 being held by the holding surface 82 and the holding piece 84.

After assembling the pipe 90 to the main holding part 81 of the pipe-side fixing member 70, the fixing part 41 of the pipe-side fixing member 70 is fixed to the column part Pb. At this time, the abutting parts 43 of the fixing part 41 abut the assembly surface Pa.

Next, the second wire member 30 is assembled to the auxiliary holding part 61 of the pipe-side fixing member 70. The following procedure is similar to the fixing procedure of the second wire member 30 in the first section 30A. The second wire member 30 is, however, inserted from the right side of the auxiliary holding part 61.

In the second section 30B, the pipe 90 and the second wire member 30 are collectively fixed to the panel P in this manner.

In this way, in the present embodiment, the second wire member 30 is post-installed in the wire-side fixing member 40 that is holding the first wire member 20 and the pipe-side fixing member 70 that, is holding the pipe 90.

The operation and effect of the present embodiment will now be described.

(1) The wire harness 10 includes the first wire member 20 that is routed alongside the pipe 90 and the second wire member 30 that is routed in between the first wire member 20 and the pipe 90 and fixed to both the first wire member 20 and the pipe 90. The second wire member 30 has the first section 30A extending along the first wire member 20 and the second section 30B extending along the pipe 90 at a position spaced further from the first wire member 20 than is the first section 30A in the direction in which the pipe 90 and the first wire member 20 are arranged alongside each other.

According to such a configuration, the second wire member 30 is fixed to both the first wire member 20 and the pipe 90. Thus, when fixing the wire harness 10 to the vehicle V, the number of fixing members and fixing points for fixing the wire harness 10 to the vehicle V can be reduced, compared with the case where the first wire member 20, the second wire member 30 and the pipe 90 are individually fixed to the vehicle V. Accordingly, workability during routing of the wire harness 10 can be improved.

Also, the second wire member 30 has the first section 30A extending along the first wire member 20 and the second section 30B extending along the pipe 90 at a position spaced from the first wire member 20. Thus, the degree of freedom of the routing path of the second wire member 30 can be increased, compared with the case where the second wire member 30 extends along only the first wire member 20 or the pipe 90.

(2) The second wire member 30 is fixed to the first wire member 20 in the first section 30A.

According to such a configuration, the second wire member 30 is fixed to the first wire member 20 in the first section 30A extending along the first wire member 20. Thus, the task of fixing the second wire member 30 and the first wire member 20 is facilitated. Accordingly, workability during routing of the wire harness 10 can be improved.

(3) The second wire member 30 is fixed to the pipe 90 in the second section 30B.

According to such a configuration, the second wire member 30 is fixed to the pipe 90 in the second section 30B extending along the pipe 90. Thus, the task of fixing the second wire member 30 and the pipe 90 is facilitated. Accordingly, workability during routing of the wire harness 10 can be improved.

(4) The wire-side fixing member 40 is provided in the first section 30A.

According to such a configuration, the wire-side fixing member 40 is provided in the first section 30A, and thus the first wire member 20 and the second wire member 30 are collectively fixed to the panel P in the first section 30A. Thus, the number of fixing members and fixing points for fixing the wire harness 10 to the vehicle V can be reduced, compared with the case where the first wire member 20 and the second wire member 30 are individually fixed to the panel P in the first section 30A. Accordingly, workability during routing of the wire harness 10 can be improved.

(5) The wire-side fixing member 40 has the main holding part 51 that holds the first wire member 20 and the auxiliary holding part 61 that holds the second wire member 30. The main holding part 51 has the main insertion opening 53 through which the first wire member 20 is insertable. The auxiliary holding part 61 of the wire-side fixing member 40 has the auxiliary insertion opening 63 through which the second wire member 30 is insertable. With the wire-side fixing member 40 fixed to the panel P, the auxiliary insertion Opening 63 thereof is open in a direction not facing the panel P.

According to such a configuration, the second wire member 30 can be post-installed in the auxiliary holding part 61 of the wire-side fixing member 40 fixed to the panel P in a state of holding the first wire member 20. Workability during routing of the wire harness 10 can thereby be improved, compared with the case where an integrated component in which the first wire member 20 and the second wire member 30 are assembled to a fixing member is fixed to the panel P.

(6) The pipe-side fixing member 70 is provided in the second section 30B.

According to such a configuration, the pipe-side fixing member 70 is provided in the second section 30B, and thus the pipe 90 and the second wire member 30 are collectively fixed to the panel P in the second section 30B. Thus, the number of fixing members and fixing points for fixing the wire harness 10 to the vehicle V can be reduced, compared with the case where the pipe 90 and the second wire member 30 are individually fixed to the panel P in the second section 30B. Accordingly, workability during routing of the wire harness 10 can be improved.

(7) The pipe-side fixing member 70 has the main holding part 81 that holds the pipe 90 and the auxiliary holding part 61 that holds the second wire member 30. The main holding part 81 has the main insertion opening 83 through which the pipe 90 is insertable. The auxiliary holding part 61 of the pipe-side fixing member 70 has the auxiliary insertion opening 63 through which the second wire member 30 is insertable. With the pipe-side fixing member 70 fixed to the panel P, the auxiliary insertion opening 63 thereof is open in a direction not facing the panel P.

According to such a configuration, the second wire member 30 can be post-installed in the auxiliary holding part 61 of the pipe-side fixing member 70 fixed to the panel. P in a state of holding the pipe 90. Workability during routing of the wire harness 10 can thereby be improved, compared with the case where an integrated component in which the pipe 90 and the second wire member 30 are assembled to a fixing member is fixed to the panel P.

(8) With the wire harness 10 routed in the vehicle V that is in a horizontal state, the lowest part of the second wire member 30 is located higher than the lowest part of the first wire member 20.

According to such a configuration, in the wire harness 10 routed in the vehicle V that is in a horizontal state, the first wire member 20 is located lower than the second wire member 30. It is thereby possible to suppress a reduction in the distance from the ground G to the lowest part of the vehicle V in which the wire harness 10 is routed, that is, the so-called minimum ground clearance, due to providing the second wire member 30.

(9) With the wire harness 10 routed in the vehicle V that is in a horizontal state, the lowest part of the second wire member 30 is located higher than the lowest part of the pipe 90.

According to such a configuration, in the wire harness 10 routed in the vehicle V that is in a horizontal state, the pipe 90 is located lower than the second wire member 30. It is thereby possible to suppress a reduction in the distance from the ground G to the lowest part of the vehicle V in which the wire harness 10 is routed, that is, the so-called minimum ground clearance, due to providing the second wire member 30.

(10) The first wire member 20 has the first wires 21 and the metal tube 24 housing the first wires 21.

According to such a configuration, the metal tube 24 readily holds its shape, and thus the shape of the first wire member 20 is readily held along the routing path thereof. The shape of the second wire member 30 is readily held, due to the second wire member 30 being fixing to such a first wire member 20, and thus the shape of the second wire member 30 is readily held without increasing the number of fixing points to the vehicle V. Accordingly, workability during routing of the wire harness 10 can be improved.

(11) The second wire member 30 has the second conductor 32 serving as a single core wire and the second insulation coating 33 covering the outer periphery of the second conductor 32.

According to such a configuration, the single core wire readily holds its shape, and thus the shape of the second wire member 30 is readily held along the routing path thereof. The shape of the second wire member 30 is thereby readily held without increasing the number of fixing points to the vehicle V. Accordingly, workability during routing of the wire harness 10 can be improved.

MODIFICATION EXAMPLES

The present embodiment can be implemented with modifications as follows. The present embodiment and the following modification examples can be implemented in combination with each other to the extent that there are no technical inconsistencies.

Figure 7:
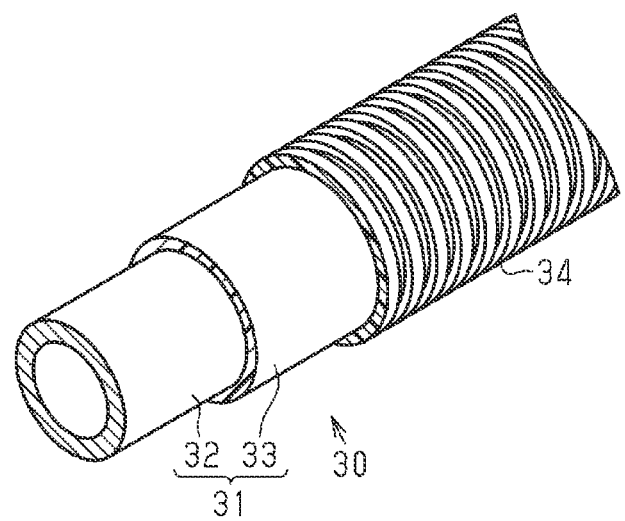
FIG. 7 is a perspective view showing the configuration of a second wire member in a first modification example.
Figure 8:
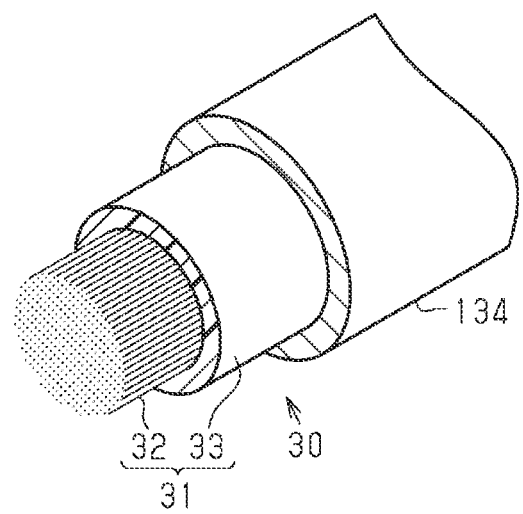
FIG. 8 is a perspective view showing the configuration of a second wire member in a second modification example.
Figure 9:
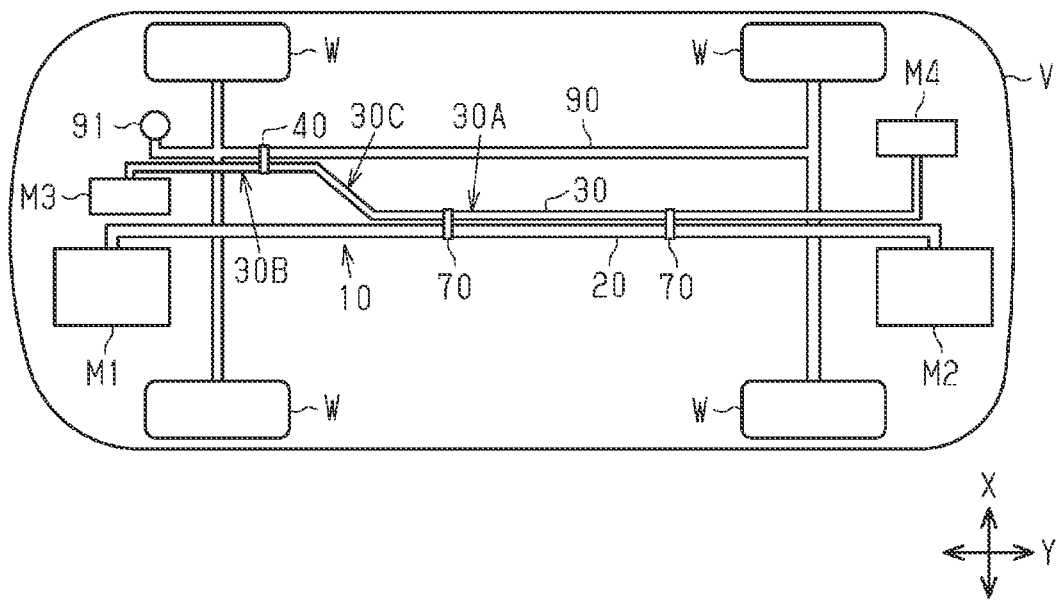
FIG. 9 is a plan view of a wire harness in a third modification example viewed from the underfloor side of the vehicle.
Figure 10:
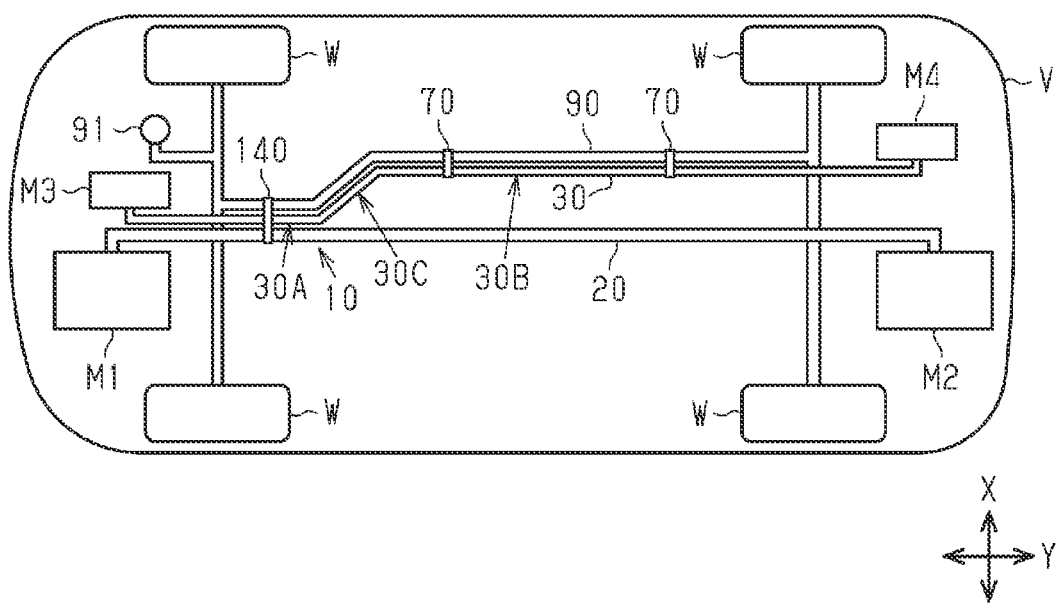
FIG. 10 is a plan view of a wire harness in a fourth modification example viewed from the underfloor side of the vehicle.

- As shown in FIG. 7, the second conductor 32 of the second wire member 30 may be a single core wire having a tubular shape.
- As shown in FIG. 8, the second conductor 32 of the second wire member 30 may be a stranded wire formed by a plurality of conductive wire strands twisted together. At this time, a tube 134 made of a metal material such as a copper or aluminum-based material can also be applied, instead of the corrugated tube 34,
- The first insulation coating 23 and the second insulation coating 33 are not limited to being formed by extrusion molding, and may alternatively be formed by heat shrink tubing that is post-installed onto the first conductor 22 and the second conductor 32, for example,
- The second wire member 30 may have a plurality of second wires 31.
- The corrugated tube 34 of the second wire member 30 can also be omit
- In the first wire member 20, a resin tube can also be employed, instead of the metal tube 24. A conductive resin material or a non-conductive resin material can be used for the resin tube, and a synthetic resin such as polyolefin, polyamide, polyester or ABS resin, for example, can be used as the resin material.
- The first wire member 20 may have one first wire 21 or may have three or more first wires 21.
- In the wire harness 10 fixed to the panel P of the vehicle V that is in a horizontal state, the lowest part of the second wire member 30 may be located at the same height as the lowest part of the first wire member 20, or may be located lower than the lowest part of the first wire member 20.
- In the wire harness 10 fixed to the panel P of the vehicle V that is in a horizontal state, the lowest part of the second wire member 30 may be located at the same height as the lowest part of the pipe 90, or may be located lower than the lowest part of the pipe 90.
- In the wire-side fixing member 40 and the pipe-side fixing member 70, the main insertion openings 53 and 83 may be open on one side in the X-axis direction, or may be open on the opposite side to the assembly surface Pa in the Z-axis direction. In these cases, the first wire member 20 and the pipe 90 can be respectively removed from the wire-side fixing member 40 and the pipe-side fixing member 70, with the wire-side fixing member 40 and the pipe-side fixing member 70 fixed to the assembly surface Pa.
- The auxiliary insertion openings 63 of the wire-side fixing member 40 and the pipe-side fixing member 70 may be open on the opposite side to the assembly surface Pa in the Z-axis direction.
- In the present embodiment, the second wire member 30 is post-installed in the wire-side fixing member 40 that is holding the first wire member 20 and the pipe-side fixing member 70 that is holding the pipe 90, but the wire-side fixing member 40 that is holding both the first wire member 20 and the second wire member 30 may be fixed to the assembly surface Pa. Also, the pipe-side fixing member 70 that is holding both the pipe 90 and the second wire member 30 may be fixed to the assembly surface Pa.
- The number of wire-side fixing members 40 and pipe-side fixing members 70 can be changed as appropriate.
- A known fixing member capable of holding the first wire member 20 and the second wire member 30 can be used, instead of or in addition to the wire-side fixing member 40. Also, a known fixing member capable of holding the pipe 90 and the second wire member 30 can be used, instead of or in addition to the pipe-side fixing member 70.
- The first wire member 20 and the second wire member 30 may be fixed to each other by a band member or tape, for example. Also, the pipe 90 and the second wire member 30 may be fixed to each other by a band member or tape, for example.
- The fixing target of the wire-side fixing member 40 and the pipe-side fixing member 70 is not limited to the panel P of the vehicle V, and may alternatively be a bracket attached to the panel P, for example.
- The wire harness 10 of the present disclosure can be applied to a vehicle in which a plurality of pipes 90 are routed alongside each other. In this case, the pipe 90 closest to the second wire member 30 among the plurality of pipes 90 and the second wire member 30 may be fixed to the panel. P by the pipe-side fixing member 70, or the pipes 90 and the second wire member 30 may be fixed to the panel P by a fixing member having a plurality of main holding parts 81.
- In the present embodiment, the second section 30B is provided rearward of the first section 30A, but is not limited thereto, and, as shown in FIG. 9, the second section 30B may be provided forward of the first section 30A. In this case, the third section 30C preferably extends at an angle so as to be positioned further to the right side moving toward the rear side of the vehicle V.
- As shown in FIG. 10, the wire harness 10 of the present disclosure can also be applied to a vehicle V including a pipe 90 that is routed along the second wire member 30, in the first section 30A, the second section 30B and the third section 30C. In this case, in the first section 30A, a fixing member 140 capable of collectively holding the first wire member 20, the second wire member 30 and the pipe 90 may be used, or the wire-side fixing member 40 and the pipe-side fixing member 70 may be used together.

As shown in FIG. 2, the vehicle V has an intermediate position between the most frontward end and most rearward end of the vehicle V. The first device M1 and the third device M3 may be referred to as front devices disposed in the front part of the vehicle V between the most frontward end and the intermediate position of the vehicle V. The second device M2 and the fourth device M4 may be referred to as rear devices disposed in the rear part of the vehicle V between the most rearward end and the intermediate position of the vehicle V.

As shown in the illustrated embodiment, the first wire member 20 may have a first front end or first base end that can be configured to be connected to the first device M1, and a first rear end or first tip end that can be configured to be connected to the second device M2. The second wire member 30 of the embodiment may have a second front end or second base end that can be configured to be connected to the third device M3, and a second rear end or second tip end that can be configured to be connected to the fourth device M4.

In the illustrated embodiment, the pipe 90 may extend to span between a first position or first terminal end that can be the same position or forward master cylinder 91) of the front wheels of the wheels W and a second position or second terminal end that can be the same position (e.g., brake calipers of rear wheels) or rearward of the rear wheels of the wheels W.

The pipe 90 of the embodiment may be referred to as a fluid pipe that can be a hydraulic pipe or as a reference pipe or a base pipe. The combination of the wire harness 10 and the pipe 90 of the embodiment may be referred to as a vehicle underfloor routing layout of a wire harness and a fluid pipe.

The present disclosure encompasses the following modes. The reference signs of a number of constituent elements of the illustrative embodiment are given not for limitation purposes but to aid understanding. Some of the matters described in the following modes may be omitted, and a number of the matters described in the modes may be selected or extracted and combined.

Supplementary Note 1.

A wire harness (10) according to a number of modes of the present disclosure may include:
  a first wire member (20) having a first base end, a first tip end, and a total length defined by the first base end and the first tip end;
  a second wire member (30) having a second base end, a second tip end, and a total length defined by the second base end and the second tip end, the total length of the second wire member (30) including a first length section (30A) adjacent to the first wire member (20) and a second length section (30B) different from the first length section (30A);
  a first fixing member (40) configured to couple the first length section (30A) of the second wire member (30) and the first wire member (20) side by side, and fix the first length section (30A) of the second wire member (30) and the first wire member (20) to a vehicle (V); and
  a second fixing member (70) configured to couple the second length section (30B) of the second wire member (30) and a long member (90) different from the wire harness (10) side by side, and fix the second length section (30B) of the second wire member (30) and the long member (90) to the vehicle (V).

Supplementary Note 2

In a number of modes of the present disclosure,
  at a position of the first fixing member (40), the first length section (30A) of the second wire member (30) may be spaced from the first wire member (20) by a first gap, in a direction intersecting a longitudinal direction of the first length section (30A), and
  at a position of the second fixing member (70), the second length section (30B) of the second wire member (30) may be spaced from the first wire member (20) by a second gap larger than the first gap, in a direction intersecting a longitudinal direction of the second length section (30B).

Supplementary Note 3

In a number of modes of the present disclosure,
  at the position of the first fixing member (40), the first length section (30A) of the second wire member (30) may be spaced from the long member (90) by a third gap larger than the first gap, in a direction intersecting the longitudinal direction of the first length section (30A), and
  at the position of the second fixing member (70), the second length section (30B) of the second wire member (30) may be spaced from the long member (90) by a fourth gap smaller than the third gap, in a direction intersecting the longitudinal direction of the second length section (30B).

Supplementary Note 4

In a number of modes of the present disclosure,
  the first fixing member (40) may be configured to not couple the first length section (30A) of the second wire member (30) and the long member (90) to each other, and
  the second fixing member (70) may be configured to not couple the second length section (30A) of the second wire member (30) and the first wire member (20) to each other.

Supplementary Note 5

A number of modes of the present disclosure relate to a vehicle underfloor routing layout of a wire harness (10) and a fluid pipe (90),
  wherein the wire harness (10) may include:
    a first wire member (20) having a first base end, a first tip end, and a total length defined by the first base end and the first tip end;
    a second wire member (30) having a second base end, a second tip end, and a total length defined by the second base end and the second tip end, the total length of the second wire member (30) including a first length section (30A) adjacent to the first wire member (20) and a second length section (30B) different from the first, length section (30A);
    a first fixing member (40) configured to couple the first length section (30A) of the second wire member (30) and the first wire member (20) side by side, and fix the first length section (30A) of the second wire member (30) and the first wire member (20) to a vehicle (V); and
    a second fixing member (70) configured to couple the second length section (30B) of the second wire member (30) and the fluid pipe (90) side by side, and fix the second length section (30B) of the second wire member (30) and the fluid pipe (90) to the vehicle (V).

The invention claimed is:

1. A wire harness for routing in a vehicle in which a pipe through which a liquid flows is attached under a floor, the wire harness comprising:
   a first wire to be routed alongside the pipe; and
   a second wire to be routed in between the first wire and the pipe, and fixed to both the first wire and the pipe,
   wherein the second wire has:
      a first section extending along the first wire; and
      a second section extending along the pipe at a position spaced further from the first wire than is the first section in a direction in which the pipe and the first wire are arranged alongside each other, and
   wherein, with the wire harness routed in the vehicle that is in a horizontal state, a lowest part of the second wire is located: (i) higher than a lowest part of the first wire; and (ii) higher than a lowest part of the pipe.

2. The wire harness according to claim 1, wherein the second wire is fixed to the first wire in the first section.

3. The wire harness according to claim 1, wherein the second wire is fixed to the pipe in the second section.

4. The wire harness according to claim 1, comprising:
   a wire-side fixing member configured to collectively fix the first wire and the second wire to a fixing target of the vehicle,
   wherein the wire-side fixing member is provided in the first section.

5. The wire harness according to claim 4, wherein:
   the wire-side fixing member has:
      a main holding part configured to hold the first wire; and
      an auxiliary holding part configured to hold the second wire,
   the main holding part has a main insertion opening open in a direction orthogonal to a longitudinal direction of the first wire and through which the first wire is insertable,
   the auxiliary holding part has an auxiliary insertion opening open in a direction orthogonal to a longitudinal direction of the second wire and through which the second wire is insertable, and
   with the wire-side fixing member fixed to the fixing target, the auxiliary insertion opening is open in a direction not facing the fixing target.

6. The wire harness according to claim 1, comprising:
   a pipe-side fixing member configured to collectively fix the pipe and the second wire to a fixing target of the vehicle,
   wherein the pipe-side fixing member is provided in the second section.

7. The wire harness according to claim 6, wherein:
   the pipe-side fixing member has:
      a main holding part configured to hold the pipe; and
      an auxiliary holding part configured to hold the second wire,
   the main holding part of the pipe-side fixing member has a main insertion opening open in a direction orthogonal to a longitudinal direction of the pipe and through which the pipe is insertable,
   the auxiliary holding part of the pipe-side fixing member has an auxiliary insertion opening open in a direction orthogonal to the longitudinal direction of the second wire and through which the second wire is insertable, and
   with the pipe-side fixing member fixed to the fixing target, the auxiliary insertion opening thereof is open in a direction not facing the fixing target.

8. The wire harness according to claim 1,
   wherein the first wire has:
      an electrical wire; and
      a metal tube housing the electrical wire.

9. The wire harness according to claim 1
   wherein the second wire has:
      a single core wire; and
      an insulation coating covering an outer periphery of the single core wire.

* * * * *